US006109410A

United States Patent [19]
Costin

[11] Patent Number: 6,109,410
[45] Date of Patent: *Aug. 29, 2000

[54] RATCHET ONE-WAY CLUTCH ASSEMBLY

[75] Inventor: Daniel P. Costin, Naperville, Ill.

[73] Assignee: BorgWarner Inc., Troy, Mich.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/390,439

[22] Filed: Sep. 7, 1999

Related U.S. Application Data

[63] Continuation of application No. 09/113,680, Jul. 10, 1998, Pat. No. 5,954,174, which is a continuation of application No. 08/707,104, Sep. 3, 1996, Pat. No. 5,853,073.

[51] Int. Cl.$^7$ .................................................. F16D 41/069
[52] U.S. Cl. ............................ 192/46; 192/71; 192/103 B
[58] Field of Search ........................... 192/46, 45.1, 71, 192/72, 64, 105 CD, 105 CF, 103 B

[56] References Cited

U.S. PATENT DOCUMENTS

| | | |
|---|---|---|
| 1,767,593 | 6/1930 | Laabs . |
| 1,883,966 | 10/1932 | Krause . |
| 2,226,247 | 12/1940 | Lesage . |
| 2,323,353 | 7/1943 | Plog . |
| 2,710,504 | 6/1955 | Dodge . |
| 3,174,586 | 3/1965 | Dotter . |
| 3,486,586 | 12/1969 | Grier, Jr. . |
| 3,554,340 | 1/1971 | Shimano . |
| 5,064,037 | 11/1991 | Long, Jr. . |
| 5,065,635 | 11/1991 | Burtner et al. . |
| 5,143,189 | 9/1992 | Meier-Burkamp . |
| 5,445,255 | 8/1995 | Rutke et al. . |
| 5,449,057 | 9/1995 | Frank . |
| 5,690,202 | 11/1997 | Myers ........................................ 192/46 |
| 5,954,174 | 9/1999 | Costin ........................................ 192/46 |

FOREIGN PATENT DOCUMENTS

| | | |
|---|---|---|
| 0 471 349 A1 | 2/1992 | European Pat. Off. . |
| 2 267 464 | 11/1975 | France . |
| 139 815 C1 | 2/1901 | Germany . |
| 375 047 | 5/1923 | Germany . |
| 338693 | 3/1936 | Italy . |
| 2116 | of 1907 | United Kingdom . |
| 1 598 908 | 9/1981 | United Kingdom . |

*Primary Examiner*—Richard M. Lorence
*Attorney, Agent, or Firm*—Artz & Artz; Greg Dziegielewski

[57] ABSTRACT

A ratchet one-way clutch assembly is disclosed. The assembly has an inner race with a plurality of notches, an outer race with a plurality of pockets, and a plurality of pawl members positioned in the pockets for engagement with the notches. The pawl members have a pivot ridge which mates with a peak or recess in the pockets in the outer race to precisely position the pawl in the pocket. The pawl center of the mass is selectively positioned such that the pawl can have a tendency to become engaged or disengaged with the notches in the inner race. In an alternate embodiment, a spring member is utilized to provide a tilting force on the pawl members toward engagement. Garter springs, coil springs, ribbon springs, or the like can be used for this purpose. Axial retainment members, such as washers, can also be used with the present invention. One or more of the retainment (retainer) members further can have axially extending flanges for improved radial bearing capability.

19 Claims, 7 Drawing Sheets

RATCHET ONE-WAY CLUTCH ASSEMBLY

This is a continuation of application Ser. No. 09/113,680 filed on Jul. 10, 1998, now U.S. Pat. No. 5,954,174 which in turn is a continuation of U.S. patent application Ser. No. 08/707,104, filed on Sep. 3, 1996, now U.S. Pat. No. 5,853,073, which issued on Dec. 29, 1998.

TECHNICAL FIELD

The invention relates to ratchet one-way clutch assemblies with centrifugally engaging/disengaging pawls.

BACKGROUND ART

There are various types of one-way clutch assemblies in use today. Such clutch assemblies include sprag-type, roller-type, and pawl ratchet-type assemblies. All of these one-way clutch assemblies work satisfactorily depending upon the particular application in which they are used.

In certain transmissions, increased torque capacity is needed for one-way clutch assemblies. Space constraints also require that the size of the clutch assembly be retained within certain limits. Current one-way clutch assemblies with sprags or rollers are often insufficient to add increased load carrying capacity and still maintain the space constraints.

Pawl one-way clutch assemblies can add increased nominal load capacity for a given package size. The design limits of a ratchet-type pawl clutch assembly are dictated by contact stress between the pawls and the races and/or bending, shear, and hoop stresses generated within the races.

Ratchet clutch assemblies have at least one pawl which acts to lock two notched or pocketed races together in one direction and rotate freely in the other direction. In general, the differences between known ratchet clutch assemblies relate to the control of the movement of the pawls and the effect on that movement by centrifugal forces.

Ratchet clutch assemblies are shown, for example, in U.S. Pat. Nos. 2,226,247, 3,554,340, and 5,449,057. Another ratchet clutch assembly is shown in British Patent No. 2116. The '340 patent discloses a free-wheeling bicycle hub assembly with a ratchet clutch. Under the action of centrifugal forces at high speed, the pawls can be thrown out of the joints and suffer extreme wear.

The '247 patent discloses another bicycle free-wheeling hub assembly with a ratchet clutch assembly. The pawls have a rectangular cross-section and are positioned loosely in the pockets in order to move freely. The looseness makes the position of the pawl center of mass and thus the movement of the pawl uncontrollable.

In the '057 patent, the motion of the pawls is controlled by pivoting axles that pass through the pawls. The axles are positioned on a retainer and add complexity and cost to the design. It is also difficult to position the holes in the pawls for the axles with sufficient precision for high speed operation.

In the British 2116 patent, the pawls are mounted on axles positioned on a retainer. The axles again add complexity and cost to the design. Also, centrifugal loading during high speed operation will create high forces on the axles and could adversely affect the operation of the clutch.

It is an object of the present invention to provide an improved ratchet one-way clutch assembly. It is another object of the present invention to provide an improved ratchet clutch assembly which has improved operation at high speeds.

It is still another object of the present invention to provide a ratchet one-way clutch assembly in which the pawls are provided with a tilting force or inclination toward engagement. It is a still further object of the present invention to provide a ratchet one-way clutch assembly which utilizes springs to place tilting forces on the pawls toward engagement.

SUMMARY OF THE INVENTION

The present invention provides a ratchet one-way clutch assembly which includes a plurality of pawls positioned in pockets in the outer race of a clutch assembly. A plurality of corresponding notches are positioned on the outer circumference of the inner race to mate with the pawls in locking engagement during relative rotation of the races in one direction. The pawls have peaks or ridges on one side which mate with pivot ridges or recesses in the pockets in the outer race. The center of mass of the pawls is situated or positioned such that when the clutch rotates the centrifugal force on the center of mass causes the pawl to move toward the engaged position. This is accomplished without an axle or stationary pivot.

The ridge in the outer race pocket is located relative to the center of mass of the pawls in order to control the engaging force. This is necessary for high speed durability.

In another embodiment of the invention, spring members, such as garter springs, coil springs, ribbon springs, etc. are used to provide tilting or biasing forces on the pawls toward engagement. The spring forces can be applied on one or more circumferential grooves in the pawls, or the spring forces can act on the pawl members themselves or in recesses that extend axially along the length of the pawl.

Other embodiments of the invention utilize one or more axial retainment devices. These devices include pairs of washers, or plastic retainers with axial extending flange members. The devices retain the pawls axially and also hold the races in axial radial alignment, while allowing relative rotation. The retainment devices also act as thrust bearings and can retain required lubrication to prevent excessive wear of the pawls.

The present invention ratchet one-way clutch assembly has particular use in vehicle transmissions and can be used in environments where both races rotate or where one of the races is fixed. The invention can also be used in any mechanism where a positive backstop is desired to prevent undesired reverse or backward rotation, such as in an escalator mechanism or the like.

Other features, benefits and advantages of the present invention will become apparent from the following description of the invention, when viewed in accordance with the attached drawings and appended claims.

BEST MODE(S) FOR CARRYING OUT THE INVENTION

Figure 1:
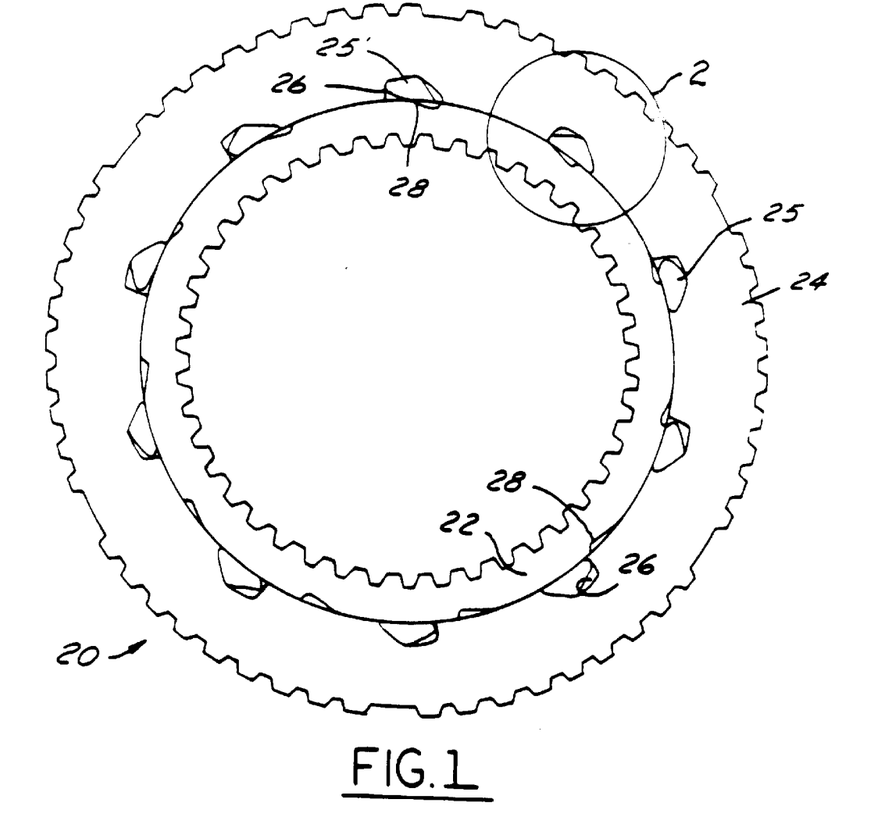
FIG. 1 illustrates a ratchet one-way clutch assembly in accordance with the present invention.

FIG. 1 schematically illustrates a ratchet one-way clutch assembly 20 in accordance with the present invention. The assembly 20 includes an inner race 22, an outer race 24, and a plurality of individual pawl members 25. The pawl members 25 are positioned in pockets 26 in the outer race member. A plurality of notches 28 are positioned in the outer circumference or periphery of the inner race 22.

When the motion of the inner race 22 relative to the outer race member 24 is in the clockwise direction in FIG. 1, the inner race rotates freely. When the relative motion of the inner race member 22 relative to the other race member 24 is counter-clockwise, the inner race and outer race are locked together by one of the pawls 25. In this regard, in FIG. 1, the locked pawl is indicated by the reference numeral 25'. The pawl 25' transmits force through pocket 26 in the outer race and notch 28 in the inner race.

In the clutch assembly shown in FIG. 1, ten pockets 26 and ten pawl members 25 are shown, together with eleven notches 28 in the inner race 22. Although the embodiment shown in FIG. 1 only shows one pawl 25' in engagement, more than one pawl can be engaged at one time if the number of pawls and notches are both wholly divisible by a common denominator other than one.

Figure 2:
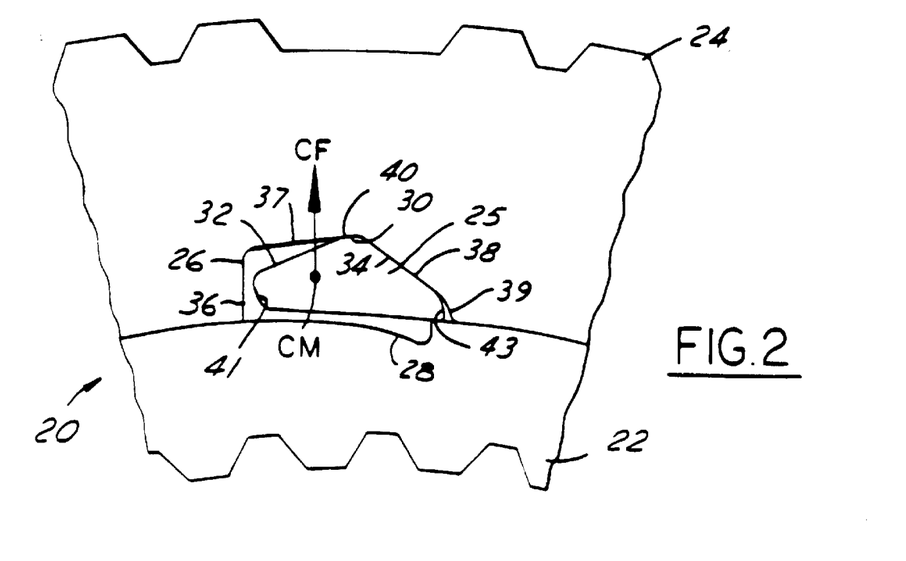
FIG. 2 is an enlarged view of a portion of the clutch assembly shown in FIG. 1.
Figure 3:
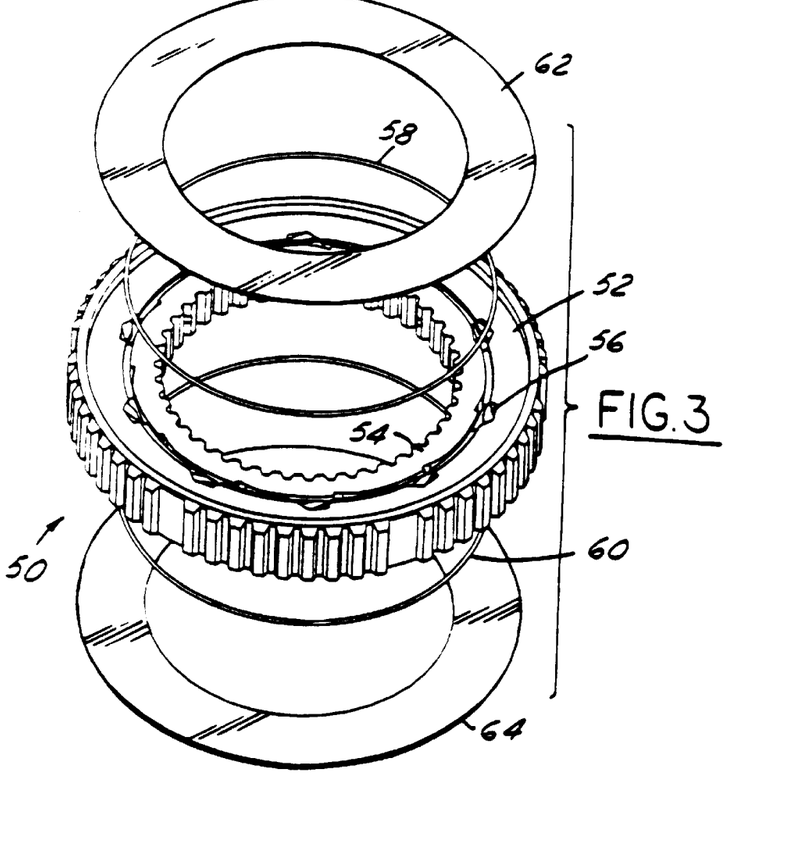
FIGS. 3 and 4 illustrate an alternate embodiment of the present invention which utilizes spring members, with FIG. 4 being an elevational view and FIG. 3 being an exploded view thereof.
Figure 4:
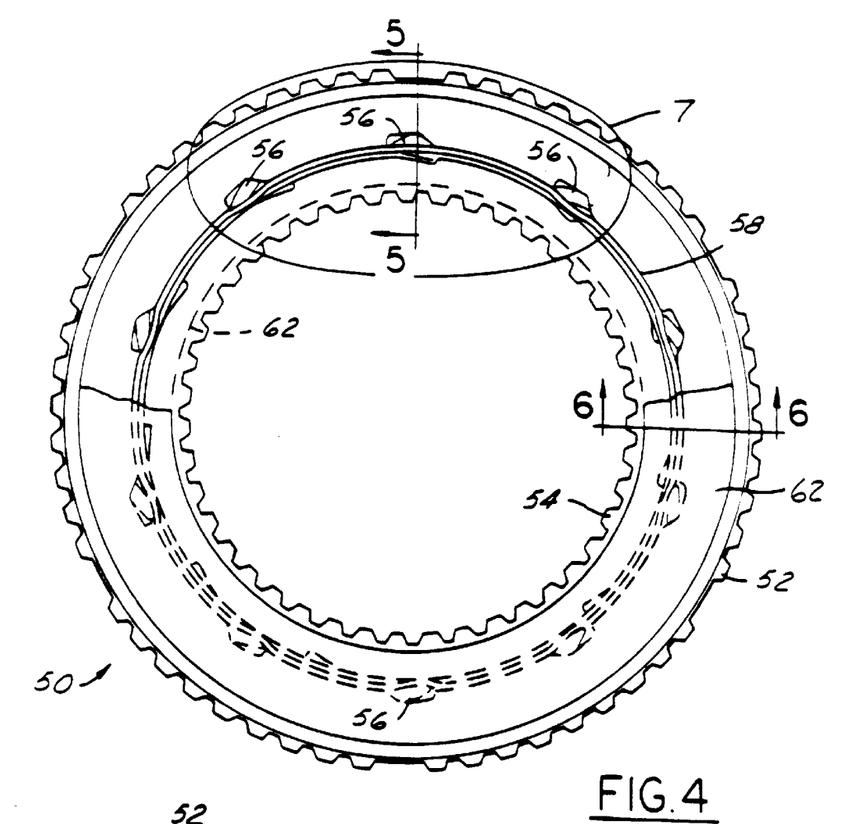
Figure 5:
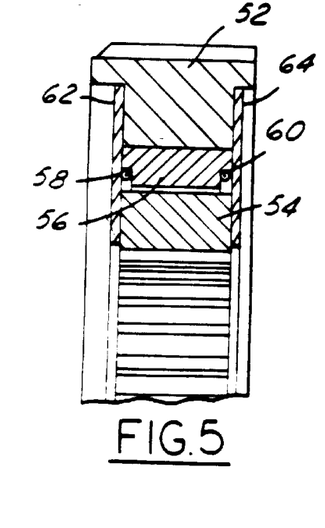
FIGS. 5 and 6 show partial cross-sectional views of the embodiment shown in FIG. 4, the cross-sectional views being taken along lines 5—5 and 6—6, respectively, in FIG. 4 and in the direction of the arrows.
Figure 6:
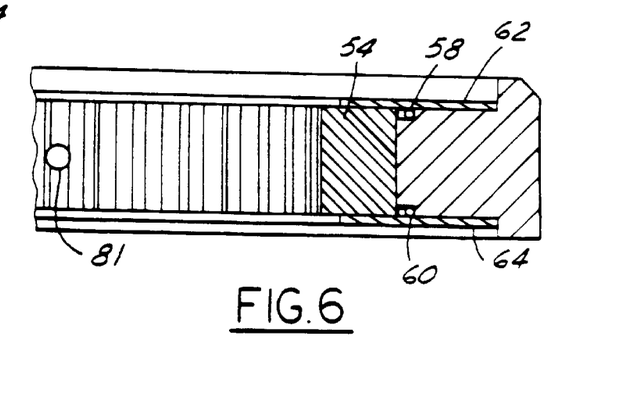

FIG. 2 is an enlarged view of a portion of the clutch assembly shown in FIG. 1. The pawl 25 shown in FIG. 2 is depicted in the free-wheeling position. In accordance with the present invention, the cross-section of the pawl 25 has a peak or pivot ridge 30 formed by the intersection of two substantially flat sides 32 and 34. The peak 30 of the cross-section forms a pivot ridge with the outer race pocket 26 which is shaped to receive the pawl. In this regard, the pocket 26 has substantially straight sides 36, 37, 38 and 39.

Preferably, in accordance with the present invention, the center of mass (CM) of the pawl 25 is positioned to the left of the pivot ridge 30 as viewed in accordance with FIG. 2. In this manner, as the clutch assembly 20 rotates, a centrifugal force (CF) on the center of mass (CM) causes the pawl 25 to move toward the engaged position, that is, the position where it would be engaged with notch 28 in the inner race 22. The torque on the pawl 25 is proportional to the tangential distance of the CM away from the ridge 30.

Although the embodiment of the invention shown in FIGS. 1 and 2 shows a pawl member with the center of mass positioned, together with the pocket in the outer race, such that the pawl has a tendency to move toward the engaged position, other embodiments can be utilized in accordance with the present invention. For example, the geometry of the pawl can be changed to provide a pawl with a disengaging tendency. In this manner, the CM could be positioned to the right of the pivot ridge 30.

The pocket 26 in the outer race also has a peak or recess 40 which mates with the pivot ridge 30 of the pawl member 25. The peak 40 in the pocket holds the pawl 25 in the proper circumferential location for free movement in the pocket. This prevents the ends 42 and 43 of the pawl member 25 from coming in contact with the sides 36 and 39, respectively, of the pocket. If the ends of the pawl were to hit the adjacent areas of the outer race pocket, friction could slow the movement of the pawl toward engagement. In accordance with the preferred use of the present invention, it is necessary for the pawls to rotate into engagement with the inner race as quickly as possible.

With the present invention, the ridge on the pawl is precisely located relative to the center of mass of the pawl, regardless of the exact location of the pawl with respect to the outer race. This allow precise control of the engaging force, which is preferred for high speed operation. This is also accomplished with a relatively simple geometry which does not include an axle, separate pivot member, or the like. Moreover, the outer race pocket is shaped such that it also has a corresponding peak or recess, which retains the pawl in a precise location in the pocket. This location prevents the pawl from contacting the sides or ends of the pocket as it rotates toward engagement.

Preferably, the pawl members 25 are made of a hardened steel material and formed by pieces cut from a drawn wire. This allows precise control of the geometry of the pawl, and also allows precise control of the center of mass relative to the peak or pivot ridge 30. In this regard, with the present invention, it is possible to control the center of mass within a tolerance of 0.001 inches.

Another embodiment of the present invention is shown in FIGS. 3–8. This embodiment is referred to generally by the reference numeral 50 in the drawings. In the one-way ratchet clutch assembly 50, a spring is used to provide a tilting force on the pawl members toward engagement. A spring is particularly needed for pawls which are disengaged centrifugally, as well as for engaging pawls that must engage when the outer race is stationary. In FIGS. 3–8, the assembly 50 includes an outer race member 52, an inner race member 54, a plurality of pawl members 56, and a pair of garter springs 58 and 60. A pair of retainment washers 62 and 64 are also provided in the embodiment shown in FIG. 3 and are discussed further below.

Figure 7:
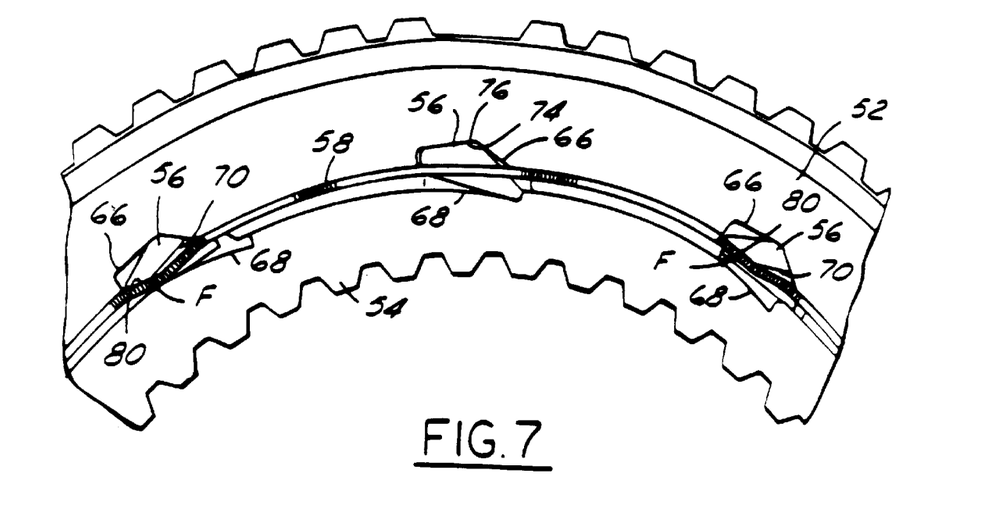
FIG. 7 is an enlarged view of a portion of the clutch assembly embodiment shown in FIG. 4.
Figure 8:
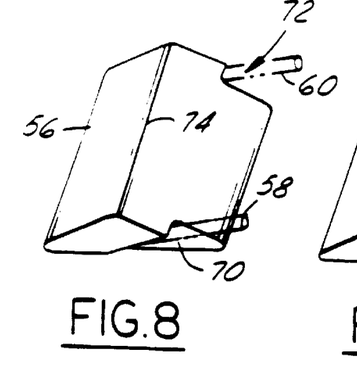
FIGS. 8, 9 and 10 illustrate various embodiments of pawl members for use with a first spring-type embodiment of the present invention.

As shown more particularly in FIG. 7, the pawl members 56 are positioned in pockets 66 in the outer race members 52 and are adapted to engage with notches 68 in the inner race 54. The garter springs 58 and 60, only one of which is shown in FIG. 7, are made from a small coil of wire and are commonly available. For the embodiment shown in FIG. 3 which utilizes two garter springs 58 and 60, pawl member 56 is utilized as shown in FIG. 8. The pawl member 56 has a pair of recesses or side grooves 70 and 72. The garter springs 58 and 60 are positioned in the grooves 70 and 72 when the pawl members are positioned in the outer race. The remainder of the pawl members 56 have sizes and shapes similar to pawl members 25 described above with respect to FIGS. 1 and 2. In this regard, the pawl members have a pivot ridge 74 which mates with a peak or recess 76 in the pocket 66.

The operation of the spring members 58 and 60 is shown with reference to spring 58 and pawl members 56 in FIG. 7. In this regard, when the pawl members are in their disengaged position, the garter spring 58 provides a force toward outer race member and thus toward the engaging position of the pawl member. This spring provides a force F (as shown in FIG. 7) against surface 80 of each of the pawl members. When the pawl members 56 are in their engaged positions, that is, mated with notches 68 in the inner race, the spring member 58 is relaxed and does not provide a spring force on the pawl members. This is shown with respect to the center pawl member 56 in FIG. 7.

Figures 9, 10:
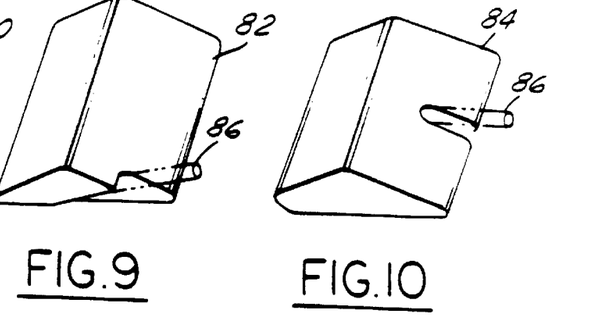

The spring force can also be arranged to act on a single side groove or a center groove of the pawl geometry. This is shown in FIGS. 9 and 10, respectively, where the pawl members are referred to by the reference numbers 82 and 84. The garter spring is indicated in phantom lines and is referred to by reference numeral 86. If either of the pawl embodiments shown in FIGS. 9 and 10 are utilized with the embodiment of the invention shown in FIGS. 3–7, then the position of the ribbon spring and the number of ribbon springs provided is adjusted accordingly.

Figure 14:
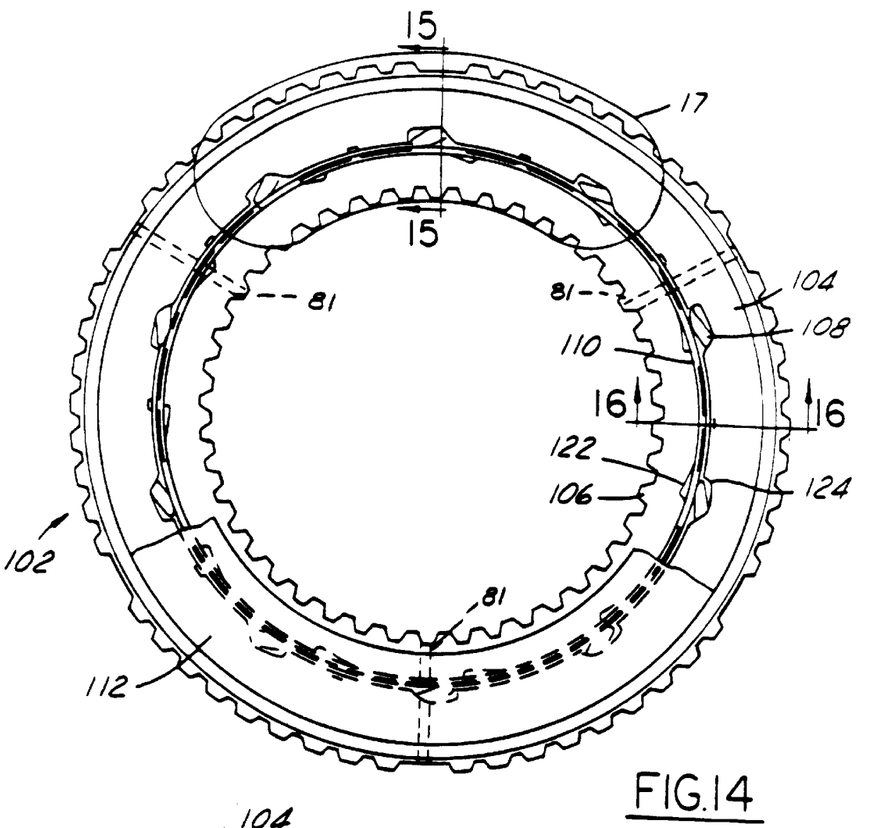
Figure 15:
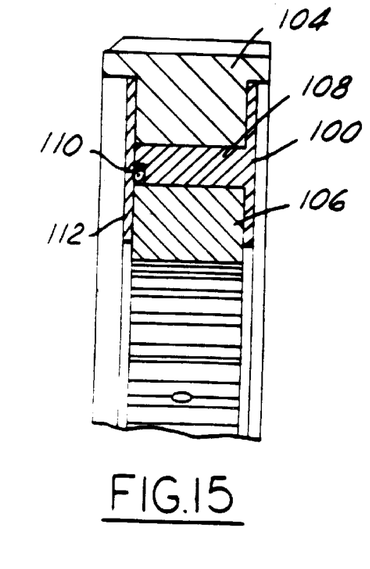
FIGS. 15 and 16 show partial cross-sectional views of the clutch assembly shown in FIG. 14, the cross-sectional views being taken along lines 15—15 and 16—16, respectively, in FIG. 14 and in the direction of the arrows.
Figure 16:
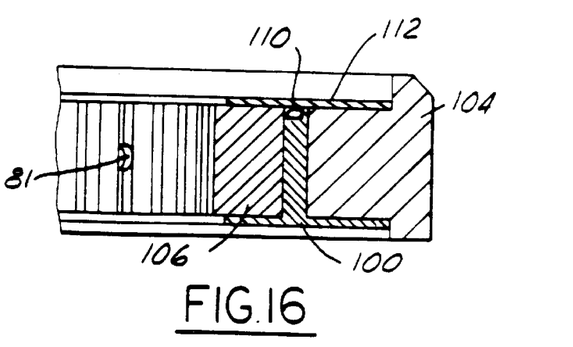
Figure 17:
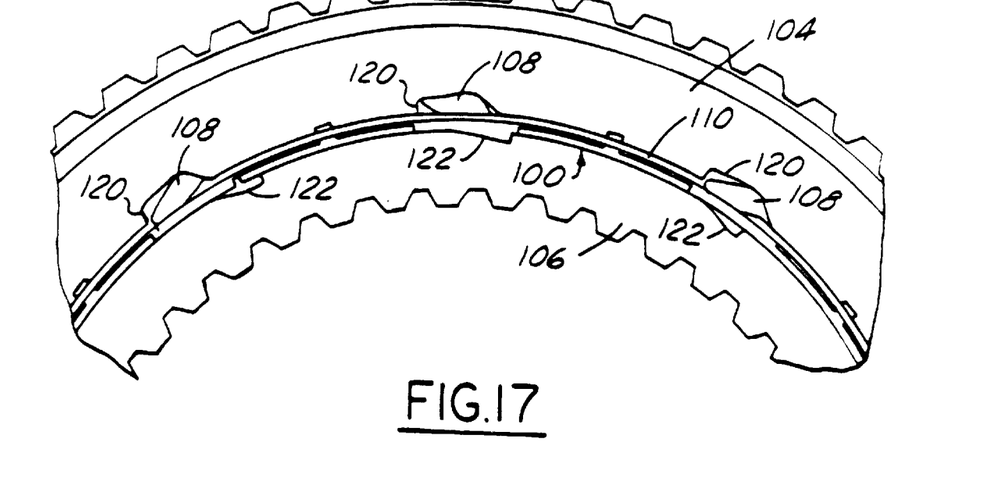
FIG. 17 is an enlarged view of a portion of the clutch assembly embodiment shown in FIG. 14.

Opening or aperture 81 in the drawings (FIG. 6) provides an access hole for lubrication relative to the transmission or other mechanism in which the one-way clutch assembly 50 is utilized. Preferably, several access holes are provided in the clutch assembly, such as the three openings 81 shown in FIG. 14.

Figures 11, 12, 13:
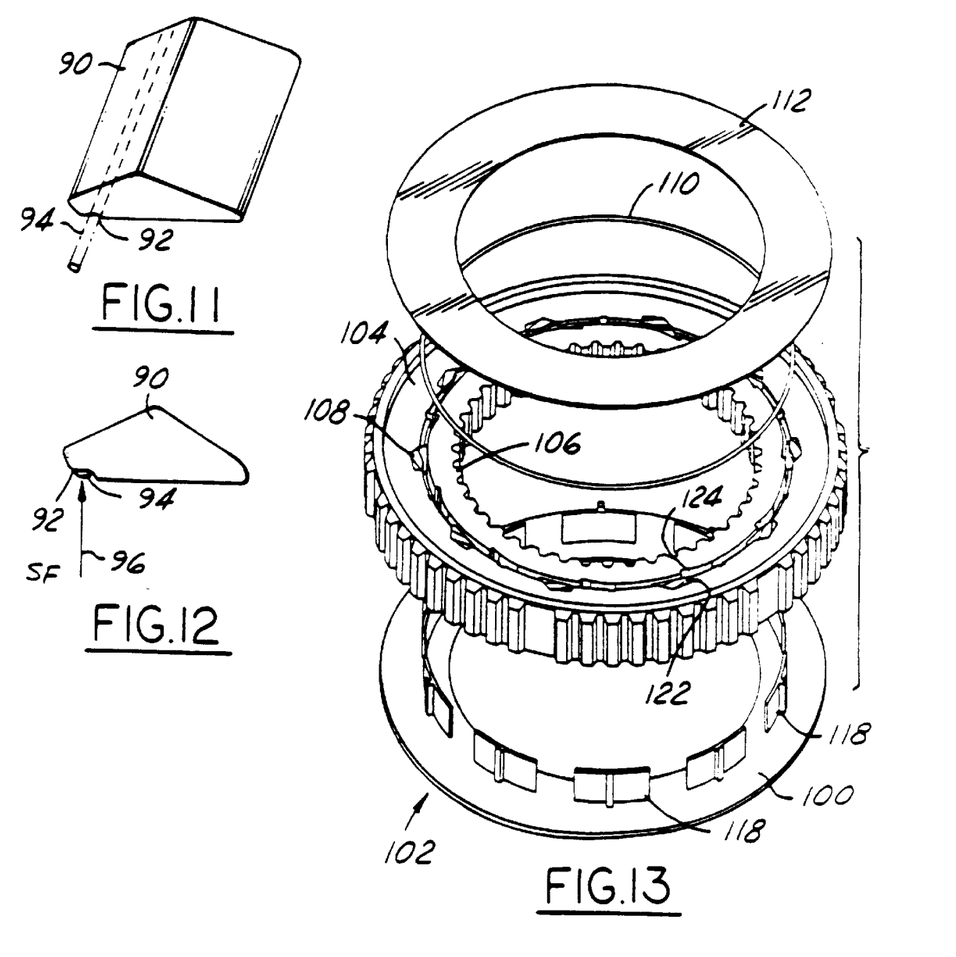
FIGS. 11 and 12 illustrate an embodiment of pawl members for use with a second spring-type embodiment of the present invention.
FIGS. 13 and 14 illustrate a still further embodiment of the present invention, with FIG. 14 being an elevational view and FIG. 13 being an exploded view thereof.

The spring force on the pawl members can also be applied in another manner. As shown in FIGS. 11 and 12, the pawl member 90 has a longitudinally or axially extending groove 92. A small ribbon spring 94 is utilized to provide a spring force (SF) in the direction of arrow 96. The ribbon springs 94 are preferably cut from thin strips of spring steel material and are positioned in the grooves 92 in order to provide a force SF toward engagement of the pawl members 90.

The washers 62 and 64 are also known as axial retainment devices or members and can be used to improve or enhance the operation of the present invention. The members 62 and 64 retain the pawl members axially (longitudinally) in the clutch assemblies. The retainment members also hold the inner and outer races in axial alignment, while allowing free relative rotation. Moreover, the axial retainment members act as thrust bearings between the clutch assembly and external parts of the mechanism that are rotating relative to the clutch assembly and must carry an axial load through the assembly. Finally, the axial retainment members (washers) 62 and 64 can retain lubrication in the clutch assembly which is required to prevent excess wear of the pawl members.

The washers 62 and 64 can be connected to the outer race through a press-fit arrangement, staking, welding, or mechanical fastening in any conventional manner.

An injection molded plastic retainer (retainment) member can also be utilized. Such a member 100 is shown in FIGS. 13–17. In these Figures, the one-way ratchet clutch assembly is referred to generally by the reference numeral 102. Together with the retainer member 100, the assembly 102 includes an outer race member 104, an inner race member 106, a plurality of pawl members 108, a garter spring member 110 and a second retainer member 112.

In this regard, in the embodiment of the invention shown in FIGS. 13–17, the pawl members 108 can be of any of the types shown and described earlier. In addition, the pawl members 108 are contained in pockets 120 in the outer race member and engage notches 122 in the inner race member, in the same manner described above with reference to the other Figures.

The retaining member 100 has a plurality of flanges or upstanding arcuate-shaped guide members 118 situated to be positioned within the annular space between the inner and outer races 106 and 104, respectively. The member 100 is a radial bearing retainer for the pawls and the race members, and also acts as a lube dam for lubrication. The retainer members 100 and 112 are preferably attached together to retain the clutch assembly together axially. The retainer members also act as thrust bearings between the assembly and external parts of the mechanism that are rotating relative to the clutch assembly and carry axial loads through the assembly. The retainer members 100 and 112 can be connected together in any conventional manner, such as a press-fit arrangement, staking, ultrasonic welding, mechanical fastening, or the like. Preferably, the retainer member 100 is made from an injection molded plastic material, and also preferably has a low friction coefficient so that it can provide improved bearing performance over regular steel-on-steel bearings.

Figure 18:
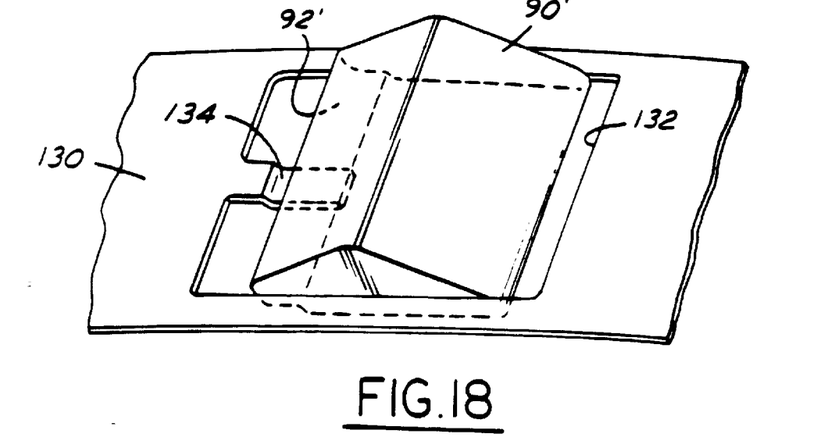
FIGS. 18 and 19 depict another ribbon spring embodiment of the present invention.
Figure 19:
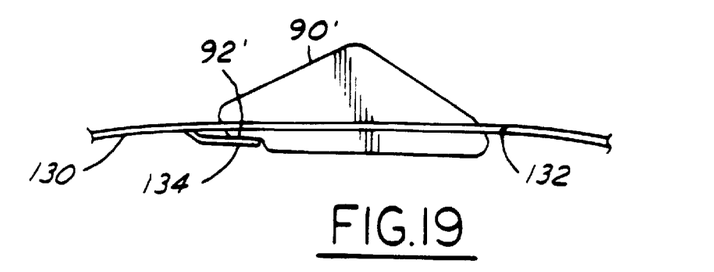

Another ribbon spring embodiment in accordance with the present invention is shown in FIGS. 18 and 19. In this embodiment, pawl members 90' are utilized which are the same as pawl members 90 described earlier. The members 90' have an axial groove 92'. A ribbon spring member 130 has an annular circular shape and is adapted to fit between the inner and outer race members of the clutch assembly. The member 130 is preferably made of spring steel and has a plurality of openings or windows 132 (only one of which is shown), each with a is tab member 134. The pawl members 90' are positioned in the openings 132 and the tab members are positioned in the grooves 92'. The ribbon spring member 130 through the tab members 134 provides biasing forces on each of the pawl members 90' in the clutch assembly toward engagement with the notches on the inner race member.

Figure 20:
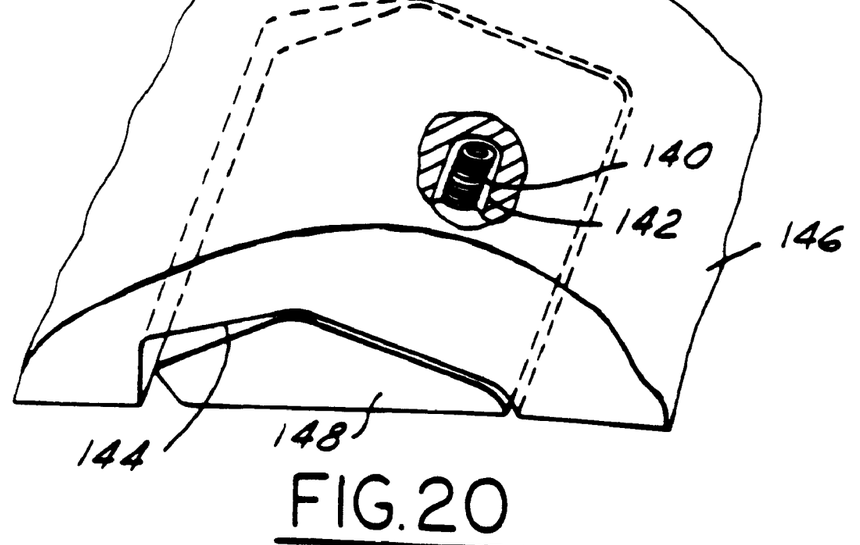
FIGS. 20 and 21 depict a coil spring embodiment in accordance with the present invention.
Figure 21:
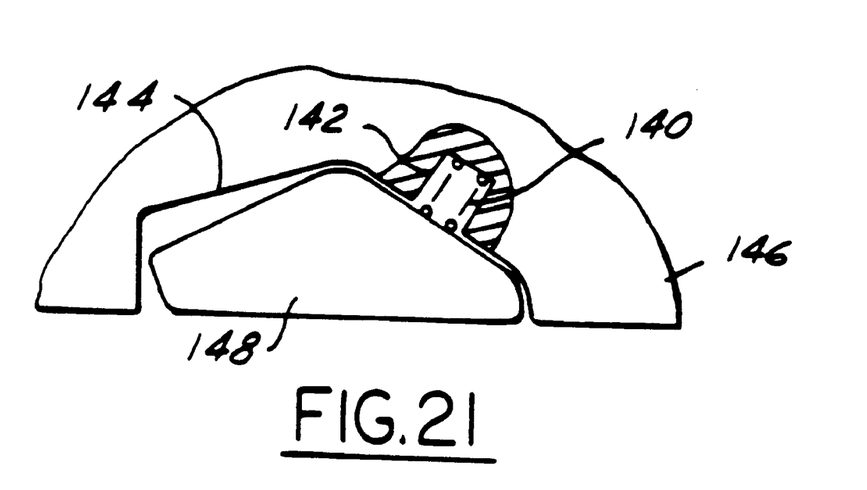

In accordance with the spirit and scope of the present invention, the spring mechanism for biasing the pawl members toward engagement with the inner race notches can have a wide variety of forms. Other than garter and ribbon springs described above, other spring members, such as coil springs, leaf springs, and the like could be utilized. In this regard, a coil spring embodiment is shown in FIGS. 20 and 21. One or more coil springs 140 are positioned in recesses or bores 142 which connect to pockets 144 in the outer race member 146. The coil springs 140 bias the pawl members 148 radially inwardly toward the inner race member.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A one-way ratchet clutch assembly comprising:
   an outer race member having a plurality of pockets;
   an inner race member having a plurality of notches;
   a plurality of pawl members, one of said pawl members being positioned freely in each of said pockets;
   said pawl members each having a lower surface positioned adjacent said inner race member, an upper surface positioned adjacent said outer race member, and an end portion for engagement with said notches; and said pawl members being retained in said pockets during rotation of one of said race members in one direction relative to the other of said race members, and at least one of said pawl members being engaged with one of said notches when said race members are rotated relative to each other in the opposite direction;

biasing means for biasing said pawl members towards engagement with said notches; and structure means for directing said pawl members toward engagement with said notches;

said structure means for directing said pawl members toward engagement with said notches comprising a ridge member on said upper surface of each of said pawl members, a corresponding mating recess member in each of said pockets, and a configuration of each of said pawl members which positions the center of mass thereof relative to said ridge member such that centrifugal force causes the pawl member to move toward the engaged position.

2. The one-way ratchet clutch assembly of claim 1 wherein said biasing means comprises at least one garter spring member.

3. The one-way ratchet clutch assembly of claim 1 wherein said biasing means comprises at least one ribbon spring member.

4. The one-way ratchet clutch assembly of claim 3 wherein said pawl members each have an axial extending groove for operatively mating with said ribbon spring members.

5. The one-way ratchet clutch assembly of claim 2 wherein said pawl members each have at least one circumferentially extending groove for positioning of said at least one garter spring member.

6. A one-way ratchet clutch assembly comprising:

an outer race member having less than ten pockets therein;

an inner race member having at least ten notches therein;

a plurality of pawl members, one of said pawl members positioned freely in each of said pockets; and spring biasing means in operative engagement with each of said pawl members for biasing said pawl members towards engagement with said notches;

said spring biasing means comprising at least one spring member positioned in operative engagement with each of said pawl members;

said pawl members each having a center of mass positioned relative to said ridge such that upon rotation of said outer race member, the pawl members arc moved toward engagement with said notches in said inner race member.

7. The one-way ratchet clutch assembly of claim 6 wherein said at least one spring member is a ribbon spring member.

8. The one-way ratchet clutch assembly of claim 6 wherein said spring biasing means comprises a plurality of individual spring members, one of said spring members being positioned in operative engagement with each of said pawl members.

9. The one-way ratchet clutch assembly of claim 8 wherein said spring biasing means comprises a plurality of coil spring members.

10. The one-way ratchet clutch assembly of claim 6 wherein said at least one spring member comprises a garter spring member.

11. The one-way ratchet clutch assembly of claim 10 wherein two garter spring members are provided.

12. The one-way ratchet clutch assembly of claim 10 further comprising a positioning groove means in each of said pawl members for positioning therein said at least one garter spring member.

13. A one-way ratchet clutch assembly comprising:

an outer race member having a plurality of pockets;

an inner race member having a plurality of notches;

a plurality of pawl members, one of said pawl members positioned freely in each of said pockets; and biasing means for biasing said pawl members towards engagement with said notches;

said biasing means comprising at least one spring member positioned in operative engagement with each of said pawl members;

said pawl members each having a lower surface positioned adjacent said inner race member, an upper surface positioned adjacent said outer race member, and an end portion for engagement with said notches;

said pawl members each having a ridge on said upper surface and said pockets each having a corresponding recess for mating with said ridge;

said pawl members each having a center of mass positioned relative to said ridge such that upon rotation of said outer race member, the pawl members are moved toward engagement with said notches in said inner race member;

wherein a number of said notches are provided which is different in number than the number of said pawl members.

14. A one-way ratchet clutch assembly comprising:

an outer race member having a plurality of pockets;

an inner race member having a plurality of notches;

a plurality of pawl members, one of said pawl members positioned freely in each of said pockets; and biasing means for biasing said pawl members towards engagement with said notches;

said biasing means comprising at least one spring member positioned in operative engagement with each of said pawl members, said at least one spring member comprising a ribbon spring member;

said pawl members each having a lower surface positioned adjacent said inner race member, an upper surface positioned adjacent said outer race member, and an end portion for engagement with said notches;

said pawl members each having a ridge on said upper surface and said pockets each having a corresponding recess for mating with said ridge;

said pawl members each having a center of mass positioned relative to said ridge such that upon rotation of said outer race member, the pawl members are moved toward engagement with said notches in said inner race member.

15. A one-way ratchet clutch assembly comprising:

an outer race member having a plurality of pockets;

an inner race member having a plurality of notches;

a plurality of pawl members, one of said pawl members positioned freely in each of said pockets; and biasing means for biasing said pawl members towards engagement with said notches;

said biasing means comprising at least one spring member positioned in operative engagement with each of said pawl members, said at least one spring member comprising a coil spring member;

said pawl members each having a lower surface positioned adjacent said inner race member, an upper surface positioned adjacent said outer race member, and an end portion for engagement with said notches;

said pawl members each having a ridge on said upper surface and said pockets each having a corresponding recess for mating with said ridge;

said pawl members each having a center of mass positioned relative to said ridge such that upon rotation of said outer race member, the pawl members are moved toward engagement with said notches in said inner race member.

16. A one-way ratchet clutch assembly comprising:

an outer race member having a plurality of pockets;

an inner race member having a plurality of notches;

a plurality of pawl members, one of said pawl members positioned freely in each of said pockets; and biasing means for biasing said pawl members towards engagement with said notches;

said biasing means comprising at least one spring member positioned in operative engagement with each of said pawl members, said at least one spring member comprising a garter spring member;

said pawl members each having a lower surface positioned adjacent said inner race member, an upper surface positioned adjacent said outer race member, and an end portion for engagement with said notches;

said pawl members each having a ridge on said upper surface and said pockets each having a corresponding recess for mating with said ridge;

said pawl members each having a center of mass positioned relative to said ridge such that upon rotation of said outer race member, the pawl members are moved toward engagement with said notches in said inner race member.

17. The one-way clutch assembly of claim 16 wherein a pair of garter spring members are provided.

18. A one-way ratchet clutch assembly comprising:

an outer race member having a plurality of pockets;

an inner race member having a plurality of notches;

a plurality of pawl members, one of said pawl members positioned freely in each of said pockets;

biasing means for biasing said pawl members towards engagement with said notches; and a pair of disc-shaped retention members positioned on opposite sides of said assembly;

said biasing means comprising at least one spring member positioned in operative engagement with each of said pawl members;

said pawl members each having a lower surface positioned adjacent said inner race member, an upper surface positioned adjacent said outer race member, and an end portion for engagement with said notches;

said pawl members each having a ridge on said upper surface and said pockets each having a corresponding recess for mating with said ridge;

said pawl members each having a center of mass positioned relative to said ridge such that upon rotation of said outer race member, the pawl members are moved toward engagement with said notches in said inner race member.

19. The one-way ratchet clutch assembly of claim 18 wherein one of said pair of retention members includes a plurality of guide members thereof, said guide members being positioned between said inner and outer races.

* * * * *